United States Patent [19]

Geasland

[11] Patent Number: 5,398,913
[45] Date of Patent: Mar. 21, 1995

[54] THERMAL CUTTING BAR

[76] Inventor: Gordon Geasland, Box 159, St. George, Staten Island, N.Y. 10301

[21] Appl. No.: 905,893

[22] Filed: Sep. 10, 1986

Related U.S. Application Data

[63] Continuation-in-part of Ser. No. 747,179, Jun. 21, 1985, abandoned.

[51] Int. Cl.$^6$ .............................................. B23K 7/00
[52] U.S. Cl. ........................................ 266/48; 29/517
[58] Field of Search ................ 266/48; 219/68, 69 R, 219/70, 72; 29/517

[56] References Cited

U.S. PATENT DOCUMENTS 2,131,766  10/1938  Temple, Jr. ........................... 29/517
4,416,444  11/1983  Brower ................................ 266/48

*Primary Examiner*—Scott Kastler
*Attorney, Agent, or Firm*—Caesar, Rivise, Bernstein, Cohen, & Pokotilow, Ltd.

[57] ABSTRACT

An exothermic burning rod includes exothermic fuel members extending axially within an elongate, external tube. The exothermic fuel members include an essentially ferrous inner core provided with an outer aluminum coating. A gas passage extends internally within the tube adjacent the exothermic fuel members.

15 Claims, 1 Drawing Sheet

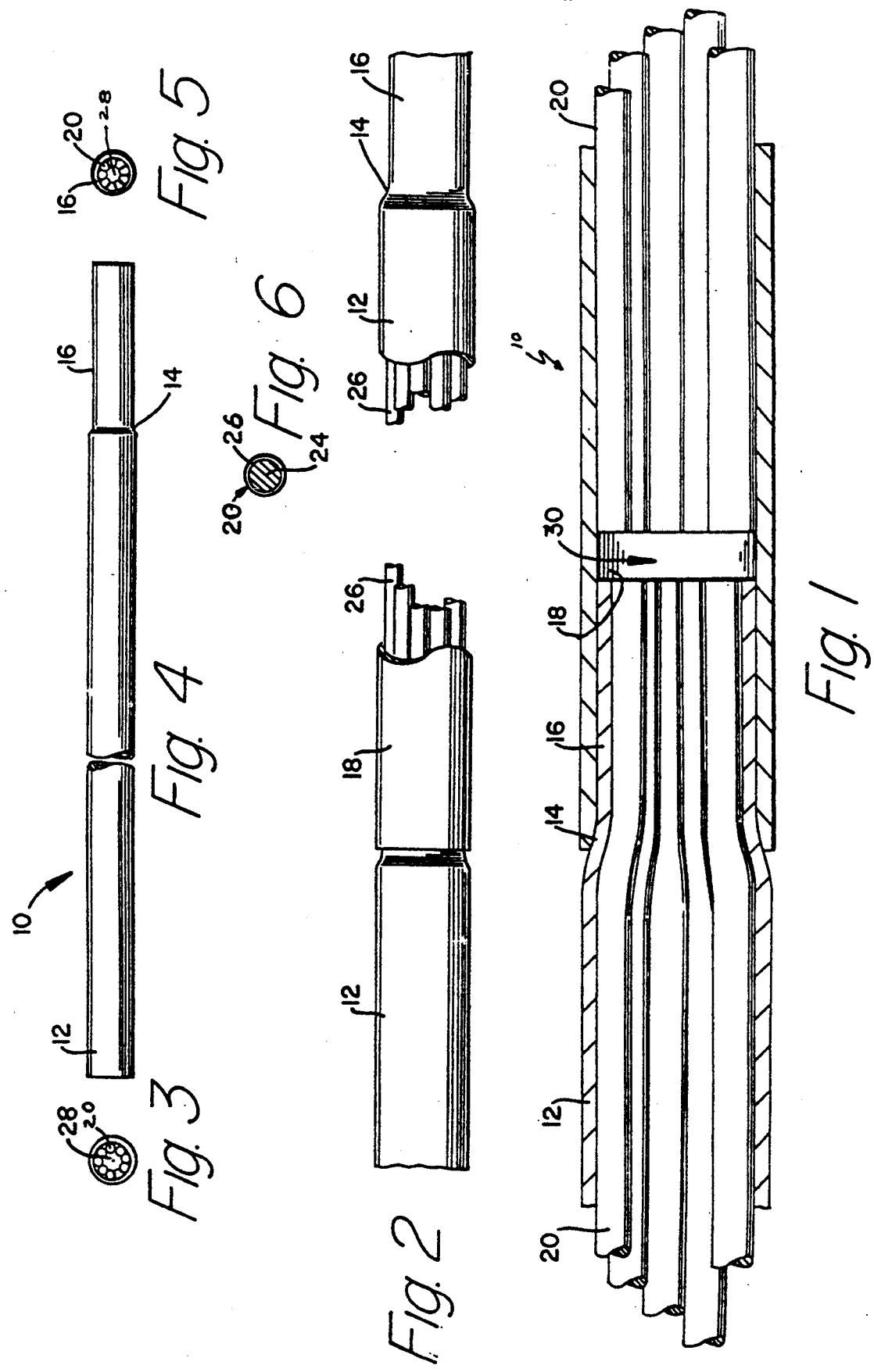

THERMAL CUTTING BAR

RELATED APPLICATION

This application is a continuation-in-part of U.S. application Ser. No. 747,179, filed Jun. 21, 1985, now abandoned and entitled THERMAL CUTTING BAR. The subject matter of the '179 application is herein incorporated by reference.

BACKGROUND OF THE INVENTION

1. FIELD OF THE INVENTION

With respect to the classification of art as established in and by the United States Patent and Trademark Office, the present invention is believed to be classified in the general class entitled "Electrical Heating" (Class 219) and in particular to the thermal cutting rods or bars used with oxygen to maintain a cutting temperature for steel, iron, concrete and the like. This bar, which sometimes is referred to as an "exothermic burning rod", includes a steel tubular shell, an interior of wire filaments and a passage through which oxygen is flowed under pressure.

2. DESCRIPTION OF THE PRIOR ART

A pre-examination search was conducted in the search room of the United States Patent and Trademark Office, and although the art is extensive pertaining to thermal cutting rods or bars, the concept of a thermal cutting bar or rod having the particular construction and composition described and claimed herein is believed to be novel.

In particular, there is to be noted U.S. Pat. No. 1,437,257 to Mattice, as issued in November 1921, which shows an electrode (not an exothermic burning rod) with a series of outer strands of steel surrounding a copper strand. U.S. Pat. No. 2,319,977 to Cape et al., as issued in May 1943, shows an electrode (not an exothermic burning rod) of ferrous alloy with a separate aluminum wire or a ferrous wire with aluminum coating. Also of note is U.S. Pat. No. 4,182,947 to Brower, as issued January 1980, and U.S. Pat. No. 4,201,902 to Rieppel, as issued May 1980.

In prior art commercially available cutting bars, a single strand of aluminum wire is employed in conjunction with a number of steel strands to provide a self-sustaining, exothermic reaction. This practice of using usually one aluminum strand isolates it and places it at best in physical contact with less than a fraction of 1% of its surface area with the adjacent steel wire components. This violates the requirement for a reaction that the components to be reacted must be in direct physical contact. The result is uneven burning with a tendency for side-wall burn, difficulty in ignition, poor thermal operating results in general, high oxygen consumption, high oxygen pressure, and large quantities of uncombined hydrogen and oxygen gases, i.e., incomplete combustion.

SUMMARY OF THE INVENTION

This invention may be summarized, at least in part, with reference to its objects. It is an object of this invention to provide, and it does provide, a thermal cutting bar in which an exothermic fuel means includes several strands of wire coated with aluminum. These aluminum coated wires are enclosed within a steel tubular envelope, preferably with the wire arrayed in a circular pattern contiguous with the inner surface of the tubular member. This tubular assembly, in accordance with a preferred embodiment of the invention, is swaged at one end to provide a reduced gripping end that may be slid into the ignition end of another bar of similar construction to save the stub, or swaged, portion thereof, or into a torch or holder with a tip having an opening with a matching taper for establishing a friction fit with said gripping end. In this latter arrangement an ejector pin or rod can be positioned in axial alignment with the rear end of the opening of the tip, and this rod can be manually actuated, against the opposing force of a spring, to engage the gripping end of the burning rod, to thereby eject said rod from the tip.

It is a further object of this invention to provide, and it does provide, a thermal cutting bar that preferably is made resistant to rust from moisture. This bar can be used above or under water with an oxygen supply. Ignition of said bar can be achieved using pyrotechnic mixtures or by holding the end of said bar against burning charcoal, wood or the like. Ignition may also be with an electric arc. It should be noted that arc-assisted burning of the exothermic burning rod of this invention, as opposed to the other described techniques, produces higher temperatures. The outer bar is a steel tube preferably provided with an outer and inner coating that is resistant or impervious to water contact. This outer tube encloses a bundle of several aluminum-coated steel wire filaments which are held in place by a swaged end reduction performed after the strands have been fitted within the tube.

There has been a long history of consumable thermal cutting devices which have been generically known as burning bars, thermic lances, oxygen lances, exothermic burning rods and deflagration devices.

On Nov. 15, 1968, Battelle Memorial Institute completed an extensive testing program for the U.S. Navy of all available burning bars. The test, "Characteristics of Burning Bars Important to Their Being Used For Underwater Salvage Operations", was issued on that date to the Supervisor of Salvage, Department of the Navy.

As defined by the Battelle Institute, a burning bar is a long, ferrous metal tube filled with ferrous or non-ferrous wire rods. The rods are held in place by crimping the tube. When pure oxygen is forced through the packed tube and the exhaust end of the tube has been heated red hot, the oxygen combines with the iron and forms iron oxide, giving off large amounts of heat in the process. This heat maintains the end of the tube at a sufficiently high temperature that the process continues.

Burning or cutting may be accomplished by pressing the hot tube against the object to be cut. If the material is readily oxidizable, such as iron, aluminum, magnesium, etc., the metal melts due to the heat given off by the reacting iron and combines with the excess oxygen coming through the tube. The resultant reaction quickly cuts a hole. If the material doesn't readily oxidize, such as concrete, brick, brass and the like, the material is melted and flows or blows away. Battelle states the advantages of tested burning bars to be (1) low cost, (2) simple, (3) lightweight, (4) easy to use, and (5) capable of burning a hole in almost anything.

This hand-held or torch-held thermal cutting tool is a "consumable cutting device" used to cut, burn, and melt through almost any material—especially steel, cast iron, bronze, concrete and stone. The thermal cutting tool can attain a temperature in excess of 5,000 degrees F., and can be precisely directed by the operator. The operator simply points the burning tip at the material he or she wishes to melt. The device burns without any assist from electric current.

Basic parts of the thermal cutting bar include a tubular steel shell which can be made of various diameters, with a practical limit of approximately one inch. It may have electrical insulation on the outer surface so it may be ignited with an electric arc. The insulation also enables this bar to be used in conjunction with arc-assist cutting techniques that produce an even higher temperature. A core is provided which is a bundle of straight aluminum-coated steel wire filaments, which can vary in diameter and number depending upon the diameter of the shell. The filaments preferably are held in place at the reduced end (i.e., grip end) of the shell.

Usually the outer tube, in the drawing or production thereof, is coated with the inner and outer surface treated to resist corrosion. In many cases or conditions, it is desired that insulation be applied to the outer surface of the tube and this insulation is applied over the shell so it might be ignited with an electric arc when used with a suitable holder. It is noted that the tip end and grip end are not insulated.

Once ignited, the tip end of the bar generates a temperature in excess of 5,000 degrees F. and is capable of burning, cutting and melting away almost any material. For example, it can demolish reinforced concrete walls and floors, makes for easy demolition and removal of large steel castings and concrete machine foundations, and also can bore holes in concrete and steel when it is necessary to install wires or pipes.

The thermal cutting bar of this invention also preferably includes a stub saver construction which allows a user to save any partially burned stubs, which can result in a substantial cost savings. The user attaches by insertion a burned stub to the ignition end (i.e., unswaged end) of the bar, then relights and uses the bar in the usual manner. This stub saver design allows complete use of the bar, and thereby eliminates waste.

The stub saver feature or design also is used to attach two or more lengths of thermal cutting bars together before ignition. This allows the user to take advantage of a longer length of burning bar—so he might keep himself safely away from the burning area. The extended thermal cutting bar is also useful for reaching and cutting areas high overhead or down deep, as inside of tanks, etc., and also extends cutting time.

This consumable thermal cutting device differs from other burning bars, thermic lances, oxygen lances and deflagration devices in that it has a chemical reaction benefit due to use of aluminum-coated steel wire filaments which provide the most elementary necessary prerequisite for a chemical reaction in that the reactants are in direct physical contact with each other. The aluminum outside coating is in direct contact with both the steel wire and the oxygen flow which enables the burning action to take place once a kindling temperature is reached. The aluminum-coated steel wire filaments enable the reaction to be self-sustaining provided the oxygen flow is not interrupted. This maximizes the exposed surface area of the reactants by using aluminum-coated steel filament wires and speeds up the rate of reaction and liberates a greater amount of heat while reducing the oxygen consumption. The temperature also is more uniform, which also reduces oxygen consumption, results in more complete combustion since it reduces the amount of uncombined reactants, and reduces the chances of side-burn of the shell which makes the ignition faster and easier.

In the thermal cutting bar of this invention all filaments remain free from corrosion and will not rust, even during long periods of storage of the finished product. Furthermore, all filaments are the same, so the aluminum reactant wire cannot be mistakenly omitted. (This is frequently the case in the manufacture of the primitive burning bars which are intended to employ a separate aluminum strand of filament). If an aluminum wire is not inserted, the result is the reaction will not self-sustain itself and the reaction will cease.

In forming each thermal cutting bar with a reduced end portion by a swaging action, there are certain benefits provided which include:

This reduction can be used to grip, and preferably does grip the wire filaments so they do not fall out. The current practice by others is to hold the filament wires in the tubular shell by dimpling, indenting, or crimping the shell at intervals along its length.

This reduction of the grip end is accomplished by means of a one-step swaging operation. During this step, a mandrel forms a passageway for oxygen to travel through the center of the shell; the mandrel is removed after swaging.

The reduction forms a tapered shoulder (or transition area) surface which, in itself, creates important benefits:

(a) The O.D. of the shell may be reduced to a size slightly small than its I.D. The shoulder produces an oxygen-tight friction fit when the reduced end (grip end) is inserted into the clear (no filament) section of the ignition end of the rod. This eliminates stub waste, since partially burned stubs can be inserted into the ignition end of new thermal cutting bars and relighted.

(b) If the above operation is done, brand-new or unburned rods can be joined together to create a greater length. When the end of this extra-long cutting bar is ignited, the user can comfortably cut items in high or inconvenient places, or reach down low into tanks, dock piling s, etc. The user can also stand farther away from the burning area when necessary.

(c) The tapered shoulder created on the bar by means of the swage reduction operation creates an oxygen-tight seal with a torch holder having a similar taper. This eliminates the need for using troublesome thumb screws and/or expensive collets.

(d) The tapered shoulder fits tightly into a holder, with a friction fit, so it totally eliminates thumb screws and/or expensive collets, as are typically used.

In addition to the above summary, the following disclosure is detailed to insure adequacy and aid in understanding of the invention. This disclosure, however, is not intended to cover each new inventive concept no matter how it may later be disguised by variations in form or additions of further improvements. For this reason, there has been chosen a specific embodiment of the thermal cutting bar as adopted for use with a holder and supply of pressurized oxygen and showing a preferred means for making such a bar. This specific embodiment has been chosen for the purpose of illustration and description as shown in the accompanying drawing where in:

BRIEF DESCRIPTION OF THE DRAWING

FIG. 1 is a sectional side view, partly diagrammatic and fragmentary, and showing the mating ends of two thermal cutting bars of this invention as connected for extension or saving a stub portion;

FIG. 2 is a foreshortened elevational view of interconnected burning rods, with parts broken away to show certain details of construction;

FIG. 3 is an end view of the cutting bar, this view looking into the larger (ignition) end of the cutting bar;

FIG. 4 is a fragmentary elevational view of a single length of cutting bar or rod;

FIG. 5 is an end view of the cutting bar, this view looking into the swaged and reduced end (i.e., gripping end) of the bar; and FIG. 6 is an enlarged sectional view of the aluminum-coated ferrous rod or wire used in this invention.

In the following description and in the claims various details are identified by specific names for convenience. These names are intended to be generic in their application. Corresponding reference characters refer to like members throughout the several figures of the drawing.

The drawing accompanying, and forming part of this specification discloses details of construction for the purpose of explanation, but structural details may be modified without departure from the concept and principles of the invention and the invention may be incorporated in other structural forms than shown.

DESCRIPTION OF THE PREFERRED EMBODIMENT OF THE INVENTION

Referring now in greater detail to the various figures of the drawings wherein like reference characters refer to like parts, a thermal cutting bar embodying the present invention is generally indicated at 10 in FIGS. 1 and 4. This bar includes an outer ferrous tube 12. This tube usually is steel tubing with an outer coating providing this tube with a resistance to corrosion so that rusting is not a problem. This coating, which is not indicated by an identification number, may be oil, grease compatible with oxygen, or a metallic coating such as aluminum, zinc or copper. A like protective coating is conventionally provided within the tube. The manner of protection is conventional. One end of the tube 12 is swaged to provide a neck or shoulder portion 14, and a reduced diameter end (or gripping) portion 16. The tube 12 is usually a drawn tube, but it may also be a lap welded tube provided there is no bead in the area where the two tubes mate.

The outer ferrous tube 12 of the burning rod 10 preferably is clear of core material at 18 to provide an unobstructed gripping sleeve portion for the reduced end portion 16 of a similar burning rod. Within the tubular portion 12 is disposed a multiplicity of aluminum-coated ferrous, i.e., steel wires or strands 20 constituting exothermic fuel means of the rod 10. These preferably are arrayed in a circular pattern alongside the confining tube 12. As seen in FIG. 6 in greatly enlarged scale, the core of this wire 20 is identified as 24 and has an aluminum coating 26 applied to the wire by the wire manufacturer before assembly of the thermal cutting bar.

The assembly of this bar leaves an interior passageway 28 free of fuel members 20 for the flow of the pressurized oxygen. This passageway is shown most clearly in FIG. 3 and 5. There is depicted a space 30 (FIG. 1) between the burning (or ignition) end of the thermal cutting bar and the reduced gripping end of said bar. This space is usually less than one-sixteenth of an inch.

USE AND OPERATION OF CUTTING BAR

Thermal cutting bar use and operation is not new, as above noted, but the thermal cutting bar of this invention is believed to be patentably novel as a result of utilizing unique aluminum-coated, ferrous fuel elements. An additional patentably novel feature resides in constructing each rod or bar 10 so that it is capable of use either by itself, or serially connected to similarly constructed rods or bars, to either permit the lengthening of the burning rod or bar, or the utilization of stubs which otherwise would be wasted. The reduced end portion 16 establishes a friction-fit, oxygen-tight seal with the inner surface of tube section 18. As noted earlier, the interior of the rod 10, as seen in FIGS. 3 and 5, has a central passageway 28 free of wires 20 for the flow of pressurized oxygen fed to and through a holder or oxygen supply tube.

When insulation (preferably an epoxy for small length bars and vinyl sheeting for large length bars) is provided on the tube 12 to permit electrical arc ignition, the grip end 16, and the very tip of portion 18 are not insulated, so that the necessary electric arc may be stuck. This end rapidly becomes molten and burns in the presence of oxygen. As this forward end burns away, the aluminum-coated wires or stands 20 burn at a high temperature. When it is desired to cease the burning, the flow of oxygen through the rod or bar is terminated. If a short bar portion (stub) remains, this stub portion may be inserted into a new cutting bar. The reduced end or gripping portion 16 is not altered in any by use, so this reduced end fits within, and is seated snugly in the end portion 18. The taper or shoulder 14 insures that an oxygen-tight fitting is made, and as the reduced end 16 is pressed into the end 18 the uninsulated portions are brought to a tight relationship to each other. Usually the tubing 12 is made with a coating of copper, which is an excellent electrical conductor, but steel tubing also is a conductor.

Although an insulated coating is applied to the outer surface of the tube 12 (except for the tip end and grip end, which are uninsulated) when electric arc ignition is required, it may be desirable to include this insulation on all burning bars, even when they are intended to be more simply lit with a flame. The reason for this is to preclude someone from inadvertently attempting to employ electrical arc-ignition with an uninsulated rod; thereby potentially resulting in serious injury, or even death to the user. It also should be noted that the outer tube is required to be electrically conductive when arc-ignition is employed. However, when a flame or pyrotechnic agent is employed to ignite the rod electrical conductivity is not so required.

As noted above, the aluminum coating 26 (which is a fuel component) over the core 24 of the wire insures that non-ferrous material is present on and with each strand and for the purposes of a thermal cutting bar is sufficient. The coating of aluminum is usually at least one-to two-thousandths of an inch. The spacing 30 is exaggerated in FIG. 1, and in actual practice is usually about one-sixteenth of an inch or less and, when burning occurs, this space is rapidly bridged in burning use without a shutting down of the process. Once started, the burning of the bar is sustaining as long as the oxygen supply is maintained.

Terms such as "left", "right", "up", "down", "bottom", "top", "front", "back", "in", "out" and the like are applicable to the embodiment shown and described in conjunction with the drawing. These terms are merely for the purpose of description and do not necessarily apply to the position in which the thermal cutting bar may be constructed or used.

While a particular embodiment of the thermal cutting bar has been shown and described, it is to be understood that the invention is not limited thereto and protection is sought to the broadest extent the prior art allows.

I claim:

1. An exothermic burning rod comprising:
   an elongate external tube means;
   exothermic fuel means extending axially within said tube means, further comprising:
   an essentially ferrous inner core;
   an outer coating of aluminum; and
   gas passage means internally extending within said tube means adjacent said exothermic fuel means.

2. The burning rod of claim 1 wherein said exothermic fuel means includes a plurality of axially extending members within said tube means, each of said members including an essentially ferrous inner core with an outer coating of aluminum thereon.

3. The burning rod of claim 2 wherein said axially extending members are positioned contiguous to the inner peripheral surface of said elongate external tube means for providing a substantially central passage through said tube means that is free of said fuel means, said gas passage means including said substantially central passage.

4. The burning rod of claim 3 wherein said elongate external tube means includes opposed gripping and ignition end portions, said ignition end portion having an outer and inner diameter greater than the outer and inner diameter of the gripping end portion, said end portions being interconnected through a sloped, transition section defining a neck region, said elongate fuel members extending axially within said tube means and conforming generally to the configuration of the inner surface of the tube means.

5. The burning rod of claim 4 wherein the outer diameter of the gripping end portion of said external tube means is slightly less than the internal diameter of the ignition end portion of said external tube means for permitting plural burning rods to be telescoped together, said transition section providing a seal for a gas-tight fit.

6. The burning rod of claim 5 wherein an axially length of the external tube means extending inwardly from the outer margin of the ignition end of the cutting bar a distance sufficient to receive a gripping end of a similarly constructed rod is free of exothermic fuel means.

7. The burning rod of claim 1 wherein the coating of aluminum on the essentially ferrous inner core is at least one-to-two thousandth of an inch in thickness.

8. The burning rod of claim 1 wherein said external tube means is electrically conductive.

9. The burning rod of claim 1 wherein said tube means includes a rust resistant coating thereon.

10. The burning rod of claim 9 wherein said rust resistant coating on said tube means is of a metal selected from the group of copper, zinc or aluminum.

11. The burning rod of claim 1 including an insulated coating on said tube means, said coating being ommited at regions adjacent opposed ends thereof.

12. A method of constructing an exothermic burning rod comprising providing an elongate tube formed of a ferrous material and having a first predetermined length and an inner surface, and arraying and arranging exothermic fuel means in the form of a plurality of ferrous wires of a second predetermined length different from said first predetermined length and having a coating of aluminum thereon within said tube and against the inner surface thereof to form a longitudinally extending gas passage through said tube adjacent said exothermic fuel means.

13. The method of claim 12 wherein said tube includes a first open end and a second open end and wherein said method additionally comprises the step of deforming said first end of said tube to a reduced diameter portion suitable for frictional fit within the second open end of a second, similarly constructed burning rod.

14. The method of claim 13 additionally comprising the step of placing a mandrel within said tube and with said ferrous wires being disposed thereabout, and thereafter deforming said tube in a region of the mandrel to hold said wires in place against said inner surface of said tube.

15. The method of claim 14 wherein said tube includes a first open end and a second open end and wherein said deforming step reduces the outer diameter of said first end of said tube so that it is suitable for frictional fit within the second end of a second similarly constructed burning rod.

* * * * *